United States Patent
Sato

(10) Patent No.: US 12,372,938 B2
(45) Date of Patent: Jul. 29, 2025

(54) TERMINAL MONITORING DEVICE

(71) Applicant: OMRON Corporation, Kyoto (JP)

(72) Inventor: Kenji Sato, Kyoto (JP)

(73) Assignee: OMRON Corporation, Kyoto (JP)

( * ) Notice: Subject to any disclaimer, the term of this patent is extended or adjusted under 35 U.S.C. 154(b) by 477 days.

(21) Appl. No.: 17/798,304

(22) PCT Filed: Mar. 1, 2021

(86) PCT No.: PCT/JP2021/007601
§ 371 (c)(1),
(2) Date: Aug. 8, 2022

(87) PCT Pub. No.: WO2021/182147
PCT Pub. Date: Sep. 16, 2021

(65) Prior Publication Data
US 2023/0096483 A1    Mar. 30, 2023

(30) Foreign Application Priority Data

Mar. 13, 2020  (JP) .................................. 2020-043753

(51) Int. Cl.
*G05B 19/05* (2006.01)

(52) U.S. Cl.
CPC .... *G05B 19/058* (2013.01); *G05B 2219/1215* (2013.01); *G05B 2219/14097* (2013.01)

(58) Field of Classification Search
CPC .......... G05B 19/058; G05B 2219/1215; G05B 2219/14097; G05B 19/05; G05B 19/042; H04L 41/22; H04L 43/0817
(Continued)

(56) References Cited

U.S. PATENT DOCUMENTS

2001/0033548 A1* 10/2001 Saleh .................. H04J 14/0295
370/389
2010/0232317 A1* 9/2010 Jing ........................ H04L 41/12
370/254
(Continued)

FOREIGN PATENT DOCUMENTS

| CN | 103460650 | 12/2013 |
|----|-----------|---------|
| CN | 110362027 | 10/2019 |

(Continued)

OTHER PUBLICATIONS

"Search Report of Europe Counterpart Application", issued on Mar. 25, 2024, pp. 1-12.
(Continued)

*Primary Examiner* — Thomas C Lee
*Assistant Examiner* — Michael Tang
(74) *Attorney, Agent, or Firm* — JCIPRNET

(57) ABSTRACT

The present invention facilitates the confirmation of the state of a slave device. This terminal monitoring device (10) comprises: a terminal information acquisition unit (14) for acquiring, from terminals of a network, terminal information including the addresses of the respective terminals, information for each type, and information pertaining to communication states; and a terminal list screen generation unit (151) that generates a terminal list screen on which selection boxes for displaying the terminals and the terminal information are disposed side by side on the basis of the terminal information and that displays the generated screen on a display unit (12).

16 Claims, 11 Drawing Sheets

(58) Field of Classification Search
USPC .......................................................... 700/79
See application file for complete search history.

(56) References Cited

U.S. PATENT DOCUMENTS

| | | | | |
|---|---|---|---|---|
| 2013/0128771 | A1* | 5/2013 | Wen | .................... H04L 12/4637 |
| | | | | 370/254 |
| 2014/0059440 | A1* | 2/2014 | Sasaki | ................... H04L 41/145 |
| | | | | 715/735 |
| 2017/0030800 | A1* | 2/2017 | McAlpin | ................ G01M 10/00 |
| 2018/0019933 | A1* | 1/2018 | Ueda | .................... G05B 19/042 |
| 2018/0329659 | A1* | 11/2018 | Matsui | ................... G06F 3/1204 |

FOREIGN PATENT DOCUMENTS

| | | | |
|---|---|---|---|
| EP | 3270543 | | 1/2018 |
| JP | 2002123307 | | 4/2002 |
| JP | 2004133806 | | 4/2004 |
| JP | 2004140571 | | 5/2004 |
| JP | 2004140571 A * | | 5/2004 |
| JP | 2010081610 | | 4/2010 |
| JP | 4494687 | | 6/2010 |
| JP | 2014157542 | | 8/2014 |
| JP | 2015001758 | | 1/2015 |
| JP | 2017108511 | | 6/2017 |
| JP | 2018011147 | | 1/2018 |
| JP | 2018107761 | | 7/2018 |
| JP | 2019169089 | | 10/2019 |
| JP | 2019174950 | | 10/2019 |
| WO | 2015033711 | | 3/2015 |
| WO | 2018163259 | | 9/2018 |
| WO | WO-2018163259 A1 * | 9/2018 | ............. H04L 12/28 |

OTHER PUBLICATIONS

"Office Action of China Counterpart Application", issued on Nov. 13, 2023, with English translation thereof, pp. 1-19.
"International Search Report (Form PCT/ISA/210) of PCT/JP2021/007601," mailed on Apr. 20, 2021, with English translation thereof, pp. 1-4.
"Written Opinion of the International Searching Authority (Form PCT/ISA/237) of PCT/JP2021/007601," mailed on Apr. 20, 2021, with English translation thereof, pp. 1-10.
"Office Action of Japan Counterpart Application", issued on Nov. 21, 2023, with English translation thereof, p. 1-p. 12.
"Search Report of Europe Counterpart Application", issued on Mar. 5, 2024, pp. 1-12.

* cited by examiner

TERMINAL MONITORING DEVICE

CROSS-REFERENCE TO RELATED APPLICATION

This application is a 371 application of the International PCT application serial no. PCT/JP2021/007601, filed on Mar. 1, 2021, which claims the priority benefits of Japan Patent Application No. 2020-043753, filed on Mar. 13, 2020. The entirety of each of the above-mentioned patent applications is hereby incorporated by reference herein and made a part of this specification.

TECHNICAL FIELD

The invention relates to a terminal monitoring device.

RELATED ART

In the field of factory automation (FA), the control on various kinds of devices sharing work processes is performed. In order to cooperatively operate various controllers, I/O control apparatuses, manufacturing devices, etc., used in the work within fixed areas such as factory facilities, an industrial network connecting these devices, which is referred to as "field network", is constructed.

A master-slave type formed by various slave devices and a master device is adopted in the conventional industrial network. The slave device is a network terminal that controls or collects data of an apparatus in the factory or a device such as a sensor or a controller. The master device jointly manages the slave devices, and is referred to as "programmable logic controller (PLC)", for example.

In addition, a display apparatus capable of displaying the actions or the statuses of the devices may also be connected to the industrial network. In such an industrial network, multiple communication cables are stretched among the respective devices to construct the network. Ethernet/IP is an example of the industrial network (ETHERNET: registered trademark; Ethernet: registered trademark).

CITATION LIST

Patent Literature

[Patent Literature 1] Japanese Patent No. 4494687

SUMMARY OF INVENTION

Technical Problem

In the industrial network, in order to verify the status relating to the connection, communication, or action of each slave device, the administrator, etc., needs to input a command from a user interface apparatus. Thus, it is necessary to select a specific slave device and read and display required information by using commands. Such a process is complicated. Alternatively, the browability for recognizing the statuses of the respective slave devices in the entire industrial network is poor.

Therefore, a terminal monitoring device allowing to easily recognize the status of each slave device is desired. The invention is made in view of the above issue, and an objective of the invention is to realize a terminal monitoring device capable of easily verifying the statuses of the slave devices connected in the industrial network.

Solution to Problem

In order to solve the above issue, the invention adopts the following configuration. A terminal monitoring device according to an aspect of the invention is connected to a network including slave devices, as terminals, controlled by a master device. The terminal monitoring device includes: a display unit, displaying a screen; a terminal information acquisition unit, acquiring terminal information including each address, type information, and communication status information from the terminals; and a terminal list screen generation unit, generating, based on the terminal information, a terminal list screen on which selection boxes representing the terminals and displaying the terminal information are disposed side by side, and displaying the terminal list screen on a display unit.

Effects of Invention

According to the terminal monitoring device according to an aspect of the invention, the terminal monitoring device capable of easily recognizing the statuses of the slave devices connected the an industrial network is realized.

DESCRIPTION OF EMBODIMENTS

In the following, an embodiment (referred to as "the embodiment" in the following) according to an aspect of the invention is described based on the drawings.

§ 1 Application Example

Figure 1:
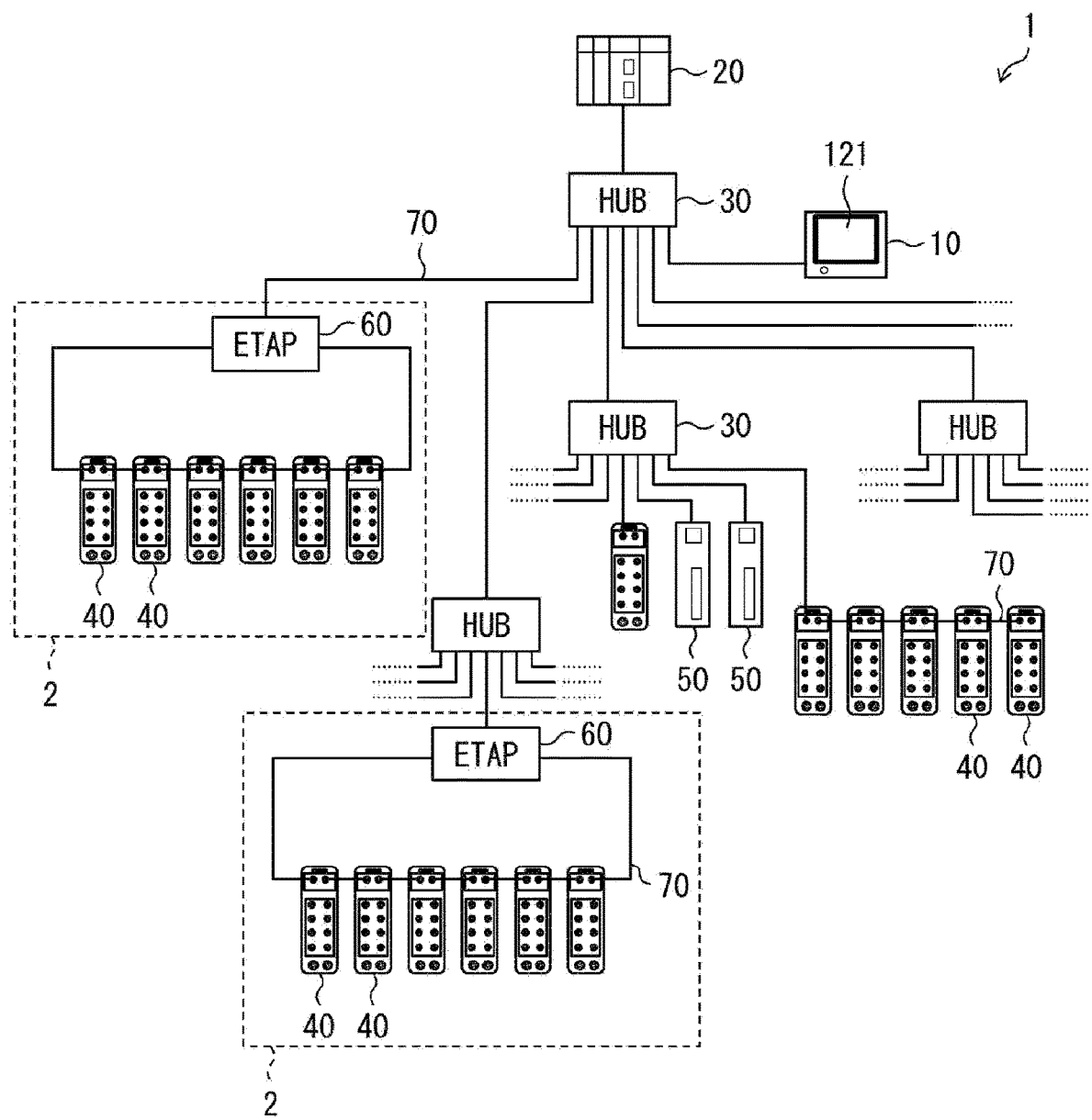
FIG. 1 is a schematic configuration diagram illustrating an industrial network to which a terminal monitoring device according to an application or respective embodiments of the invention is applied.

First of all, an example of a case to which the invention is applied is described. FIG. 1 is a schematic configuration diagram illustrating an industrial network 1 in a manufacturing factory, to which a terminal monitoring device 10 according to the application example is applied.

The industrial network 1 is formed by a master device 20 and multiple slave devices (slave devices 40, etc.) as network terminals. The respective slave devices are controlled by the master device 20 through the industrial network 1, and construct various processes in a manufacturing factory, etc.

As shown in FIG. 1, the slave devices are connected to the master device 20 via a hub 30 or another slave device. Alternatively, the slave devices may form, together with a ring supervisor 60, a partial network of a ring topology in the industrial network 1.

The terminal monitoring device 10 according to the application example is also connected to the industrial network 1. The terminal monitoring device 10 includes a display unit, a terminal information acquisition unit, and a terminal list screen generation unit. The display unit has a display 121, and the display 121 displays a screen.

The terminal information acquisition unit is a functional block acquiring terminal information including respective addresses, type information, and communication status information from the terminals in the industrial network 1. In addition, the terminal list screen generation unit is a functional block that generates a terminal list screen based on the terminal information, and displays the terminal list screen on the display unit.

The terminal list screen has a characteristic that the selection boxes representing the terminals and displaying the terminal information are arranged side-by-side. Therefore, in the terminal monitoring device 10 according to the application example, it is easy to verify the statuses of the slave devices connected to the industrial network. Alternatively, in the terminal monitoring device 10, the browsability of the statuses of the respective slave devices in the entire industrial network is favorable.

Alternatively, since the terminals are displayed as selection boxes, the administrator or the operator (referred to as the administrator, etc., in the following) of the industrial network 1 can select a specific slave device and more detailed information relating to the status of the slave device can be displayed. Accordingly, it is possible for the administrator, etc., to easily access the detailed information of the status of the slave device through the terminal monitoring device 10.

§ 2 Configuration Example

Embodiment 1

<Industrial Network>

The industrial network 1 to which the terminal monitoring device 10 according to Embodiment 1 is applied is described in greater detail by using FIG. 1. As a specific example, Ethernet/IP (ETHERNET: registered trademark; Ethernet: registered trademark) is applied to the industrial network 1.

The industrial network 1 is formed by including the master device 20 and multiple slave devices (slave devices 40, slave devices 50, and other slave devices not shown herein). The industrial network 1 is further formed to include the terminal monitoring device 10 according to Embodiment 1. The display 121 displaying a screen is provided at the terminal monitoring device 10. In addition, a control computer (not shown), which is also referred to as a tool, is connected to the industrial network 1.

A programmable logic controller is applicable to the master device 20. The slave devices (the slave devices 40, the slave devices 50, and other slave devices not shown herein) managed or controlled by the master device 20 are appropriately linked to the master device 20 via the hub 30 or another slave device. The hub 30 is a communication device that branches a communication path from the master device side (upstream side).

Alternatively, the slave devices may form, together with a ring supervisor 60, a partial network of a ring topology in the industrial network 1. In the following, such partial network is referred to as a ring network 2. The ring supervisor 60 is a communication device that constructs the ring network 2 by using multiple slave devices affiliated with the ring supervisor 60. The ring supervisor 60 is also referred to as an Ethernet/IP tap (ETAP).

At this time, the ring supervisor 60 and the slave devices managed by the ring supervisor 60 form the partial network of the ring topology. The slave devices managed by the ring supervisor 60 are linked to the master device side (upstream side) of the industrial network 1 through the ring supervisor 60.

Figure 2:
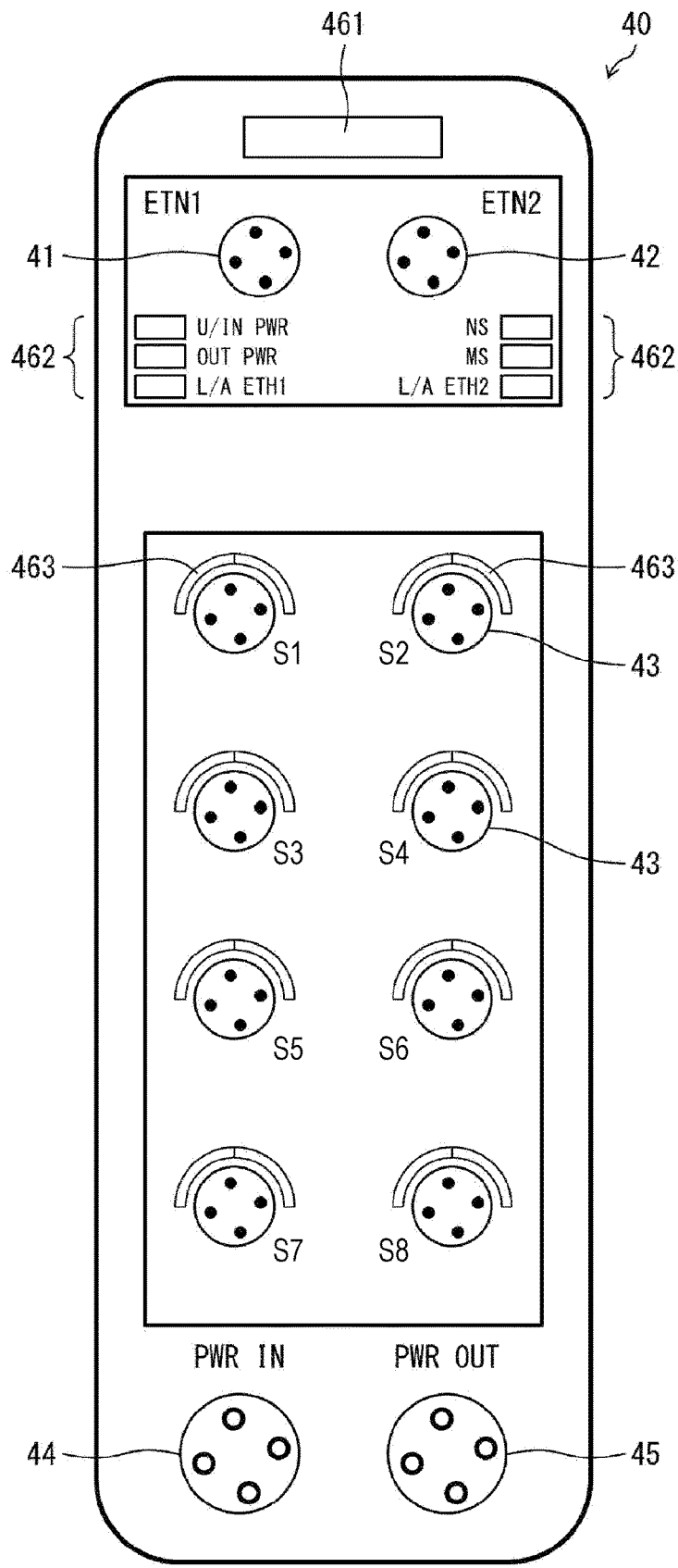
FIG. 2 is a view illustrating a specific example of a slave device applied to the industrial network.

Communication cables 70 respectively connect the terminal monitoring device 10, the master device 20, the hubs 30, the ring supervisors 60, and the slave devices. As shown in the drawings, the slave device may be further connected to another slave device (another device) by being connected to the communication cable 70 not only on the master device side but also to the opposite side (downstream side). of the master device Example of Slave Device FIG. 2 illustrates the slave device 40 as a specific example of the slave device applied to the industrial network 1. The slave device 40 is a terminal in the industrial network 1, and includes two Ethernet ports (communication ports) for connection with the industrial network 1.

In the two Ethernet ports, that is, an Ethernet port ETN1 and an Ethernet port ETN2, an Ethernet connector 41 and an Ethernet connector 42 for connection with the communication cables 70 are respectively provided.

The slave device 40 of the example is a terminal also referred to as an I/O control apparatus. Multiple devices, such as sensors or controllers, may be connected to the slave device 40 that is an I/O control apparatus. The slave device 40 includes multiple device ports for such devices, each of which is provided with a device connector 43. In the specific example of FIG. 2, the slave device 40 includes eight device ports, and symbols S1 to S8 are labeled to the sides of the respectively corresponding device connectors 43.

The slave device 40 may supply power of a required voltage to the device through the device port. In addition, the slave device 40 may receive a voltage signal from the device through the device port. In addition, the slave device 40 may conduct communication with the device through the device port in accordance with a predetermined communication specification. As a specific example of the predetermined communication specification, I/O-LINK may be adopted.

The slave device 40 further includes a power input port PWR_IN and a power output port PWR_OUT. A power input connector 44 and a power output connector 45 are respectively provided at the power input port PWR_IN and the power output port PWR_OUT.

As shown in FIG. 2, the respective connectors (the Ethernet connector 41, the Ethernet connector 42, the device connectors 43, the power input connector 44, and the power input connector 45) are disposed on the front surface of the slave device 40. In the following, the surface on the front surface side of the slave device 40 is referred to as a panel surface.

Also, FIG. 2 merely schematically illustrates each of the Ethernet connector 41, the Ethernet connector 42, the device connectors 43, the power input connector 44, and the power input connector 45, and does not serve to accurately depict the shapes thereof.

On the panel surface of the slave device 40, a lamp 461 which may notify the occurrence of an operational abnormality in the slave device 40 is disposed. In addition, on the panel surface of the slave device 40, an indicator 462 that may display a status of the operation of the slave device 40, or a communication status via the Ethernet port ETN1, the Ethernet ETN2, etc., is disposed.

As a specific example shown in FIG. 2, the indicator 462 includes the following: a lamp U/IN_PWR displaying a status of power supply to the slave device 40 through the power input port PWR_IN; a lamp OUT_PWR displaying a status of power output through the power output port PWR_OUT.

A lamp L/A_ETH1 displaying the communication status via the Ethernet port ETN1; a lamp L/A_ETH2 displaying the communication status via the Ethernet port ETN2; a network abnormality display lamp NS for displaying a communication status (network status) relating to whether the communication is normal; and a device abnormality display lamp MS for displaying a device abnormality of the slave device 40 itself.

In addition, on the panel surface of the slave device 40, a device status display lamp 463 is disposed. The device status display lamp 463 is adjacent to the device connector 43 of each device port, and displays the connection of a device to the each device port or the status of the connected device.

<Terminal Monitoring Device (10)>

Figure 3:
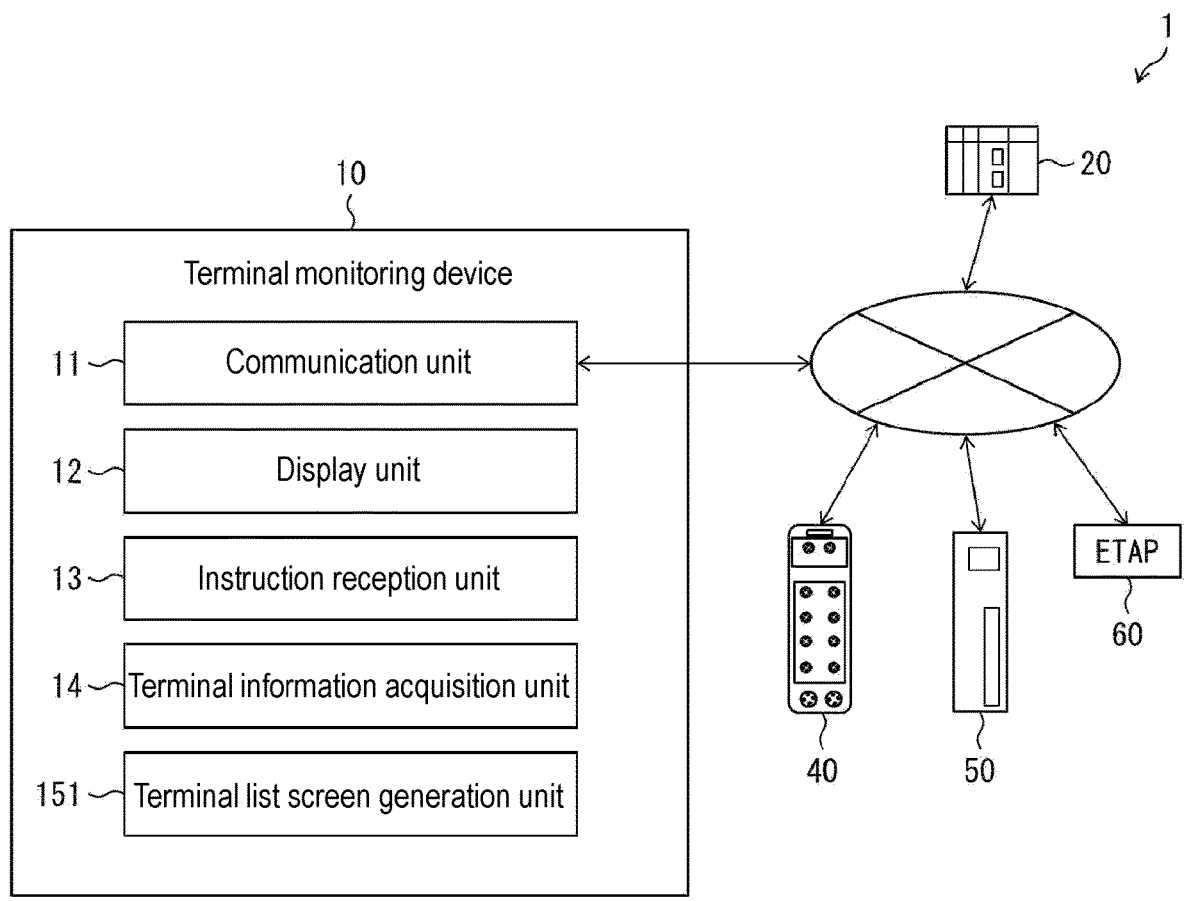
FIG. 3 is a block diagram illustrating a configuration of a terminal monitoring device according to Embodiment 1 of the invention.

FIG. 3 is a block diagram illustrating a configuration of the terminal monitoring device 10 according to Embodiment 1. The terminal monitoring device 10 according to Embodiment 1 includes a communication unit 11, a display unit 12, an instruction reception unit 13, a terminal information acquisition unit 14, and a terminal list screen generation unit 151.

The communication unit 11 is a communication interface that conducts communication with the master device 20 or the respective terminals forming the industrial network 1. The display unit 12 has a display 121, and transmits information to the administrator, etc., of the industrial network 1 through a screen displayed on the display 121.

Multiple communication ports for connection with the industrial network may also be provided at the communication unit 11. In such case, by switching the communication port, it is possible to switch the terminal monitoring device 10 to be connected to any of multiple industrial networks.

The instruction reception unit 13 is a user interface of receiving an instruction from the administrator, etc. Regarding the method for receiving an instruction from the administrator, etc., a conventional technique may be applied as appropriate. For example, a touch panel display integrated with the display 121 may be applied. Alternatively, technologies such as a keyboard, a moving button (so-called "arrow key"), a mouse, a track ball, a stylus, etc., may also be adopted.

The terminal information acquisition unit 14 is a functional block acquiring terminal information including the addresses, the type information, and the communication status information from the respective terminals forming the industrial network 1 through the communication unit 11. Examples of the respective terminals may include the slave devices 40 which are I/O control apparatuses, the slave devices 50 or other slave devices, and the ring supervisors 60.

The terminal information in the case where the terminal is the ring supervisor 60 may also include the addresses of the slave devices forming the ring network 2 managed by the ring supervisor 60.

The terminal list screen generation unit 151 is a functional block generating a terminal list screen P1 based on the terminal information and displaying the terminal list screen P1 on the display unit 12. The terminal list screen P1 in Embodiment 1 is described in the following.

<Terminal List Screen>

Figure 4:
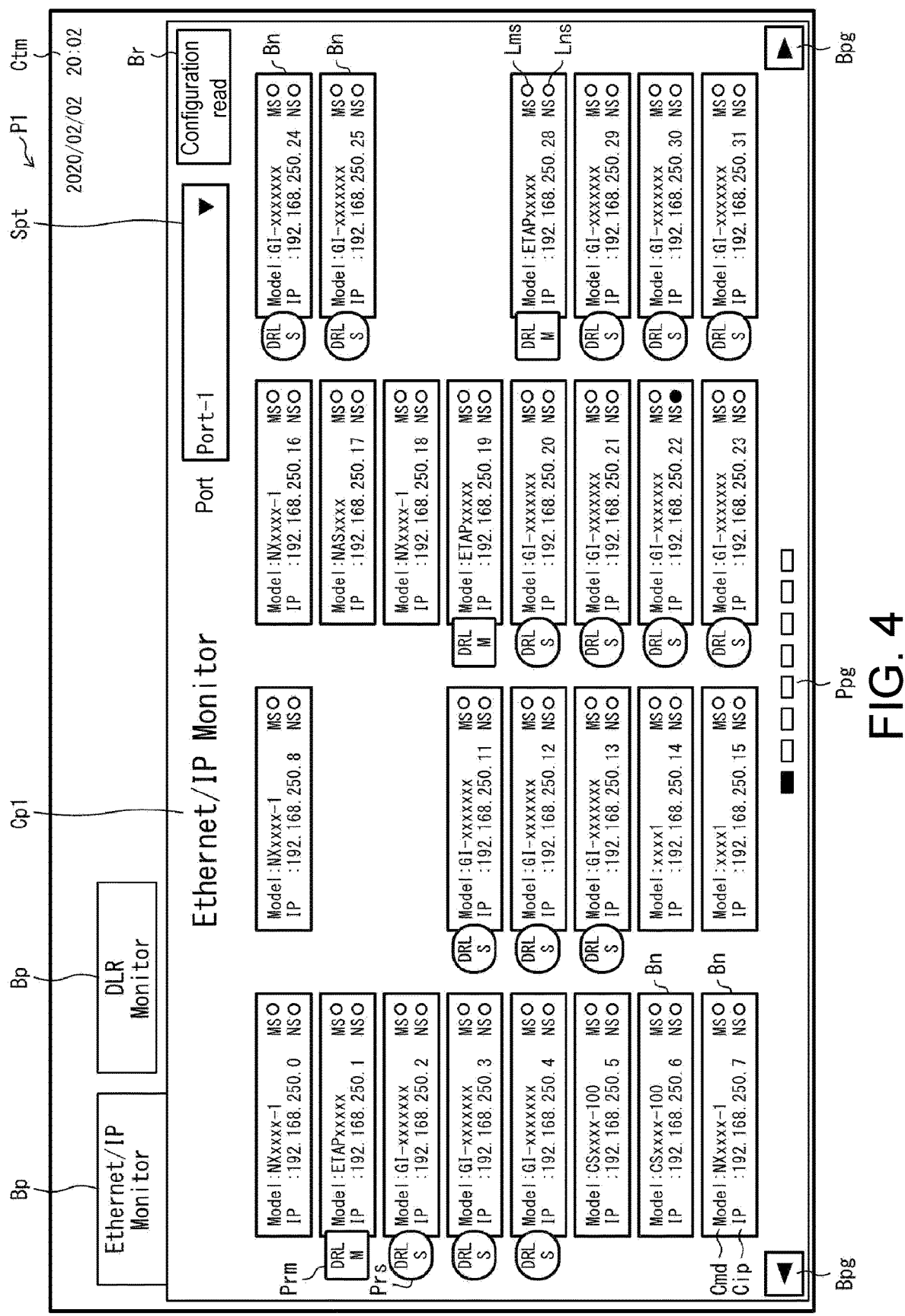
FIG. 4 is a view illustrating a terminal list screen displayed on the terminal monitoring device according to Embodiment 1 of the invention.

FIG. 4 illustrates the terminal list screen P1 generated by the terminal list screen generation unit 151 and displayed on the display 121 of the display unit 12. On the terminal list screen P1, the following is displayed.

A text expression Cp1 indicating that the screen is the terminal list screen P1. Accordingly, the administrator, etc., can clearly recognize that the screen is the terminal list screen P1. Here, as an example, "Ethernet/IP Monitor" is shown.

A screen selection box Bp indicating that there are the terminal list screen P1 and a screen other than the terminal list screen P1. By selecting a screen using the screen selection box Bp, it is easy for the administrator, etc., to select and display a desired screen on the display 121. In FIG. 4, a screen selection box displaying the terminal list screen P1 and shown as "Ethernet/IP Monitor" is selected.

A time text expression Ctm. A configuration read box Br (information acquisition instruction box) used for an operation for reading the configuration of the industrial network 1. The function of the configuration read box Br will be described in the following. A selection box Bn representing each terminal in the industrial network 1. With the administrator, etc., selecting the terminal by using the selection box Bn representing the terminal, the detailed information relating to the terminal can be displayed on the display 121 as a separate screen and acquired.

A port list box Spt for specifying a communication port in the case where multiple communication ports are provided in the communication unit 11. The administrator, etc., operates the port list box Spt and selects the communication port from the list of the multiple communication ports of the communication unit 11 that is displayed. Then, the terminal list screen P1 relating to the industrial network to which the communication port is connected is generated by the terminal list screen generation unit 151, and is displayed on the display 121 of the display unit 12.

As shown in FIG. 4, the selection boxes Bn representing the terminals are disposed side-by-side on the terminal list screen P1 in the order of Internet protocol (IP) addresses. At this time, in the case where there is a vacant number in the order of IP addresses, the position of the vacant number is displayed as a vacant field without the selection box Bn representing the terminal.

Therefore, even in the case where the terminals in the industrial network 1 are increased or decreased, a selection box Bn representing a specific terminal is disposed at the same position. In the industrial network 1, through changing, retooling, etc., of the processes, the connection of terminals, such as the slave devices, may be modified, or the power of an apparatus not in use may be turned off.

Even in such case, since the selection box Bn representing a specific terminal keeps staying at the same position, the administrator viewing the terminal list screen P1 may easily grasp the conditions of the terminals in the industrial network 1.

Since the number of the terminals of the slave devices, etc., in the industrial network may be a large number as many as hundreds or more, it is often that the selection boxes Bn representing all the terminals do not fit one screen. Therefore, the terminal list screen P1 is configured to be capable of page-feeding.

In the specific example of FIG. 4, page feeding boxes Bpg respectively used for feeding the page forward and backward are provided at two ends of the lower part of the terminal list screen P1. In addition, at the center of the lower part of the terminal list screen P1, an image expression Ppg illustrating the pages, where figures representing the respective pages are arranged in the total number of pages.

In the image expression Ppg representing the pages, by displaying the figure representing the currently displayed page in a color different from the color of the figures representing other pages, the administrator, etc., can easily recognize which page of all the pages is displayed.

On the selection box Bn representing the terminal, a text expression Cmd of the model information of the terminal and a text expression Cip of the IP address are displayed. Accordingly, the administrator, etc., can easily recognize which apparatus model the terminal in the industrial network that is specified by the IP address is.

The selection box Bn representing the terminal is provided with an expression representing the properties of the terminal. Here, as an example for representing the properties of the terminal, a figure expression Prm representing that the terminal is the ring supervisor 60 and a figure expression Prs representing that the terminal is a slave device forming the ring network 2 are displayed.

Moreover, by not showing such expressions, a terminal is shown as not a terminal forming the ring network 2. Accordingly, the administrator, etc., can easily recognize the presence of the ring network 2 constructed in the industrial network 1 and the apparatuses forming the ring network 2.

Moreover, an image expression which is like a lamp and expresses the status of the terminal is displayed in the selection box Bn representing the terminal. Here, as an example of the status of the terminal, a machine status image Lms is displayed. In the machine status image Lms, a machine status on whether the terminal itself suffers from an apparatus abnormality is represented in colors.

In addition, in the selection box Bn representing the terminal, a communication status image expression Lns is displayed. In the communication status image expression Lns, the network status on whether the communication of the terminal is abnormal is represented in colors. Accordingly, the administrator, etc., can view through these terminals and easily recognize whether each terminal in the industrial network 1 is abnormal.

<Generation of Terminal List Screen>

The terminal list screen P1 is generated according to the following. The instruction reception unit 13 detects that the administrator, etc., operates the configuration read box Br. The terminal information acquisition unit 14 performs broadcasting to the industrial network 1 through the communication unit 11.

Each terminal in the industrial network 1 receiving broadcasting returns a telegraphic message with IP address and model information to the terminal monitoring device 10. The terminal information acquisition unit 14 acquires a portion of the apparatus information of each terminal from the telegraphic messages. The terminal list screen generation unit 15 generates, based on the apparatus information, the terminal list screen P1 in which the selection box Bn representing each terminal is disposed.

In addition, in the case where the apparatus information of the terminal is the ring supervisor, the terminal information acquisition unit 14 may inquire the terminal about the addresses of the slave devices forming the ring network 2 and receives the result of the inquiry. The terminal list screen generation unit 151 adds the figure expression Prm indicating that the terminal is the ring supervisor 60, the figure expressions Prs indicating that the terminals are the slave devices forming the ring network 2 to the selection boxes Bn representing the terminals.

When the administrator, etc., operates the configuration read box Br again, the series of operations are executed, and the terminal list screen P1 representing each terminal able to communicate in the industrial network 1 at the time point is generated.

The terminal information acquisition unit 14 periodically inquires about and receives the status of the terminal from each terminal whose IP address is acquired. In accordance with such information, the terminal list screen generation unit 151 determines the colors of the machine status image expression Lms and the communication status image expression Lns of the selection box Bn representing the terminal. Accordingly, the administrator can learn, in a real-time manner, the status of each terminal on the display 121.

Embodiment 2

Another embodiment of the invention will be described in the following. For the ease of description, components having the same functions as the components having been described in the above embodiment are labeled with the same reference symbols, and the descriptions thereof will not be repeated.

<Terminal Monitoring Device (10A)>

Figure 5:
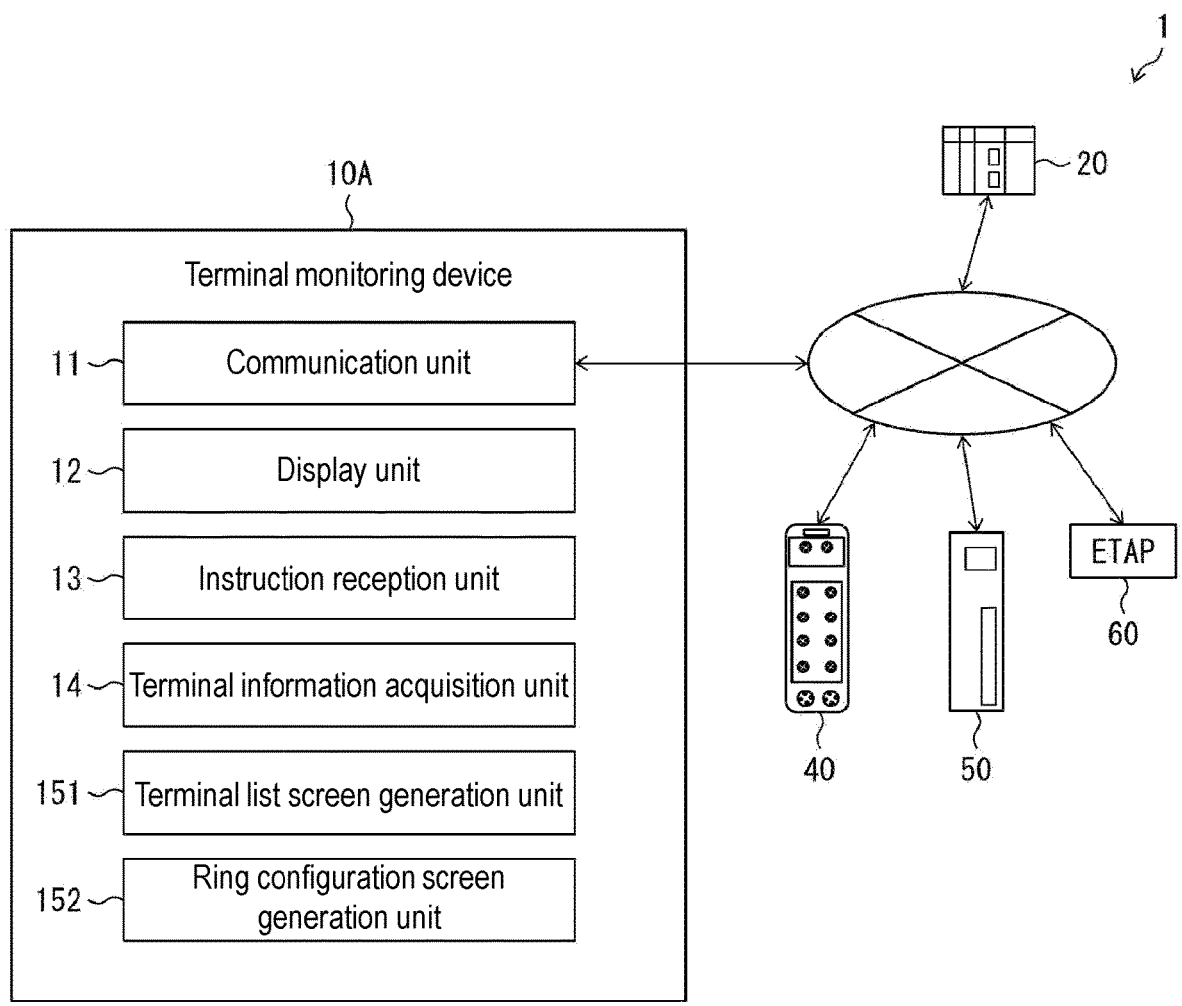
FIG. 5 is a block diagram illustrating a configuration of a terminal monitoring device according to Embodiment 2 of the invention.

In the terminal monitoring device 10A according to Embodiment 2, it is possible to display a ring configuration screen P2 in addition to the terminal list screen P1 which can be displayed by the terminal monitoring device 10 according to Embodiment 1. FIG. 5 is a block diagram illustrating a configuration of the terminal monitoring device 10A.

The terminal monitoring device 10A according to Embodiment 2 includes the communication unit 11, the display unit 12, the instruction reception unit 13, the terminal information acquisition unit 14, the terminal list screen generation unit 151, and a ring configuration screen generation unit 152.

The terminal information acquired by the terminal information acquisition unit 14 of Embodiment 2 includes the contents of the terminal information according to Embodiment 1. In addition thereto, in the case where the terminal is the ring supervisor 60, the terminal information acquired by the terminal information acquisition unit 14 includes the information relating to the configuration of the ring network 2 managed by the ring supervisor 60 and the communication status information among the terminals in the ring network 2.

The ring configuration screen generation unit 152 is a functional block generating the ring configuration screen P2 based on the terminal information and displaying the ring configuration screen P2 on the display unit 12. The ring configuration screen P2 in Embodiment 2 is described in the following.

<Ring Configuration Screen>

Figure 6:
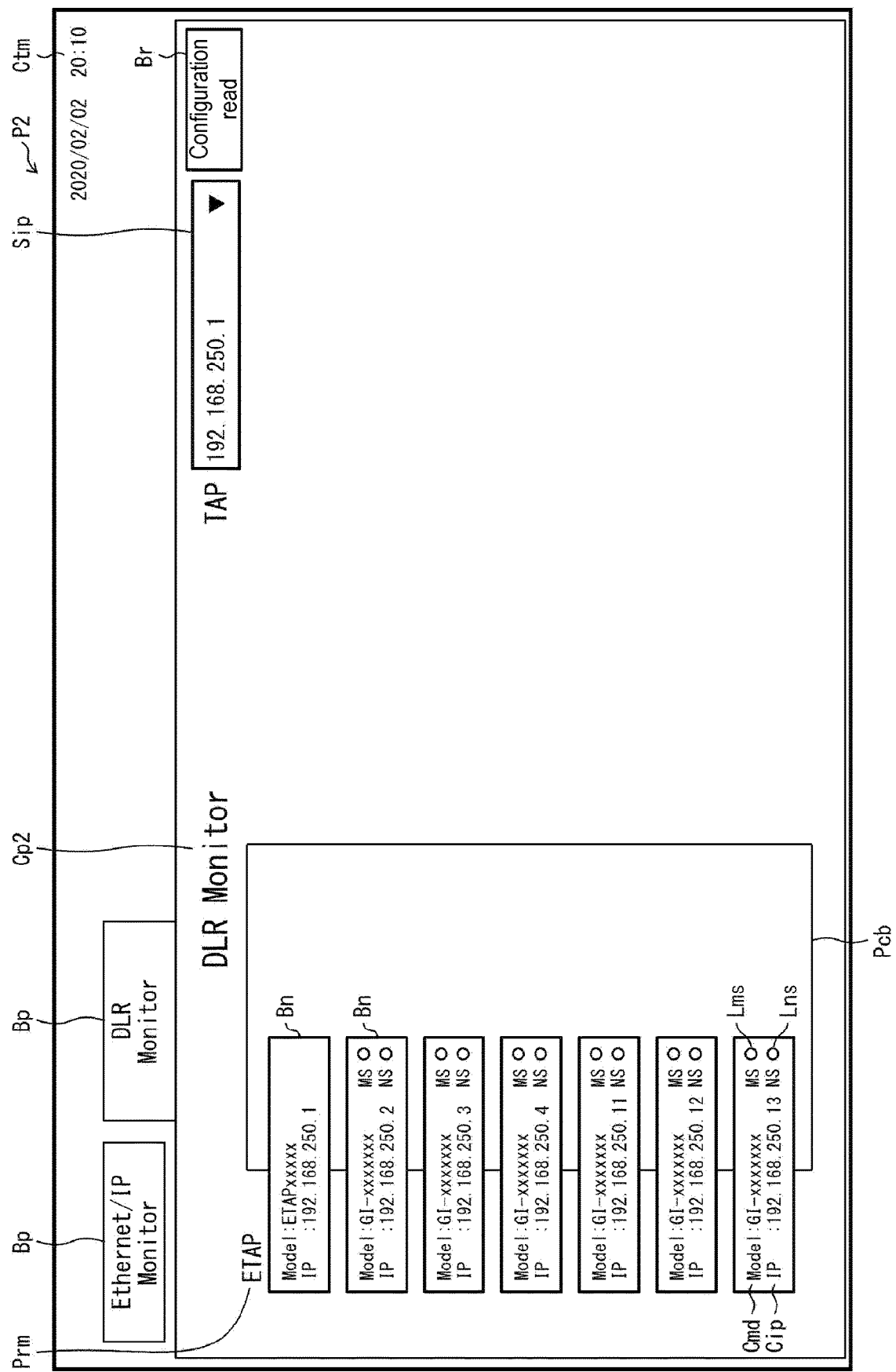
FIG. 6 is a view illustrating a ring configuration screen displayed on the terminal monitoring device according to Embodiment 2 of the invention.

FIG. 6 illustrates the ring configuration screen P2 generated by the ring configuration screen generation unit 152 and displayed on the display 121 of the display unit 12. The ring configuration screen P2 is a screen illustrating the configuration of a specific ring network 2 in the industrial network 1. On the ring configuration screen 2, the following is displayed.

A text expression Cp2 indicating that the screen is the ring configuration screen P2. Accordingly, the administrator, etc., can clearly recognize that the screen is the ring configuration screen P2. Here, as an example, "DLR Monitor" is shown.

The screen selection box Bp indicating that there are the ring configuration screen P2 and a screen other than the ring configuration screen P2. By selecting a screen using the screen selection box Bp, it is easy for the administrator, etc., to select and display a desired screen on the display 121. By making the arrangement of the screen selection box Bp same as the terminal list screen P1, the administrator, etc., can easily recognize the presence of each screen.

For example, when the administrator, etc., performs an operation of selecting "DLR Monitor" from the screen selection box BP on the terminal list screen P1, the screen displayed on the display 121 is transitioned to the ring configuration screen P2. Alternatively, when the administrator, etc., performs an operation of selecting "Ethernet/IP Monitor" from the screen selection box Bp on the ring configuration screen P2, the screen displayed by the display 121 is transitioned to the terminal list screen P1. Accordingly, it is possible to easily switch to the desired screen.

The time text expression Ctm. The configuration read box Br. The above are the same as the previous embodiment. An address list box Sip indicating the IP address of the ring supervisor 60 of the ring network 2 that is selected.

The administrator, etc., operates the address list box Sip to select the IP address of the specific ring supervisor 60 from the list of the IP addresses of the ring supervisors 60 that are displayed. Then, the administrator, etc., can select the specific ring network 2 and display the specific ring network 2 on the ring configuration screen P2.

The selection box Bn representing each terminal in the specific ring network 2 that is selected. With the administrator, etc., selecting the terminal by using the selection box Bn representing the terminal, the detailed information relating to the terminal can be displayed on the display 121 as a separate screen and acquired.

As shown in FIG. 6, the selection boxes Bn representing the terminals of the ring network 2 are connected by a connection line Pcb indicating the connection relationship among the terminals in a connection order inside the ring network 2, and are disposed side-by-side on the ring configuration screen P2. Therefore, the administrator, etc., can easily have a grasp of the configuration of the ring network 2 according to the ring configuration screen P2. This point is different from the terminal list screen P1 in which the selection boxes Bn representing the terminals are disposed in the order of IP addresses.

The text expression Cmd of the model information of the terminal, the text expression Cip of the IP address, the machine status image expression Lms, and the communication status image expression Lns displayed in the selection box Bn representing the terminal are the same as the above. The figure expression Prm added to the selection box Bn representing the terminal and illustrating that the terminal is the ring supervisor 60 is the same as the above.

Regarding the transitioning of the ring configuration screen P2, the following method can be applied. The administrator, etc., performs an operation of selecting the selection box Bn illustrating the ring supervisor 60 on the terminal list screen P1 and representing the terminal. Thus, the screen displayed on the display 121 is transitioned to the ring configuration screen P2 illustrating the ring network 2 managed by the ring supervisor 60.

On the terminal list screen P1, the image expression Prm indicating that the terminal is the ring supervisor 60 is added for the ring supervisor 60, so as to be displayed in an easily understandable manner. Accordingly, with such transition, the administrator can easily select and display the ring network 2 as the target.

Figure 7:
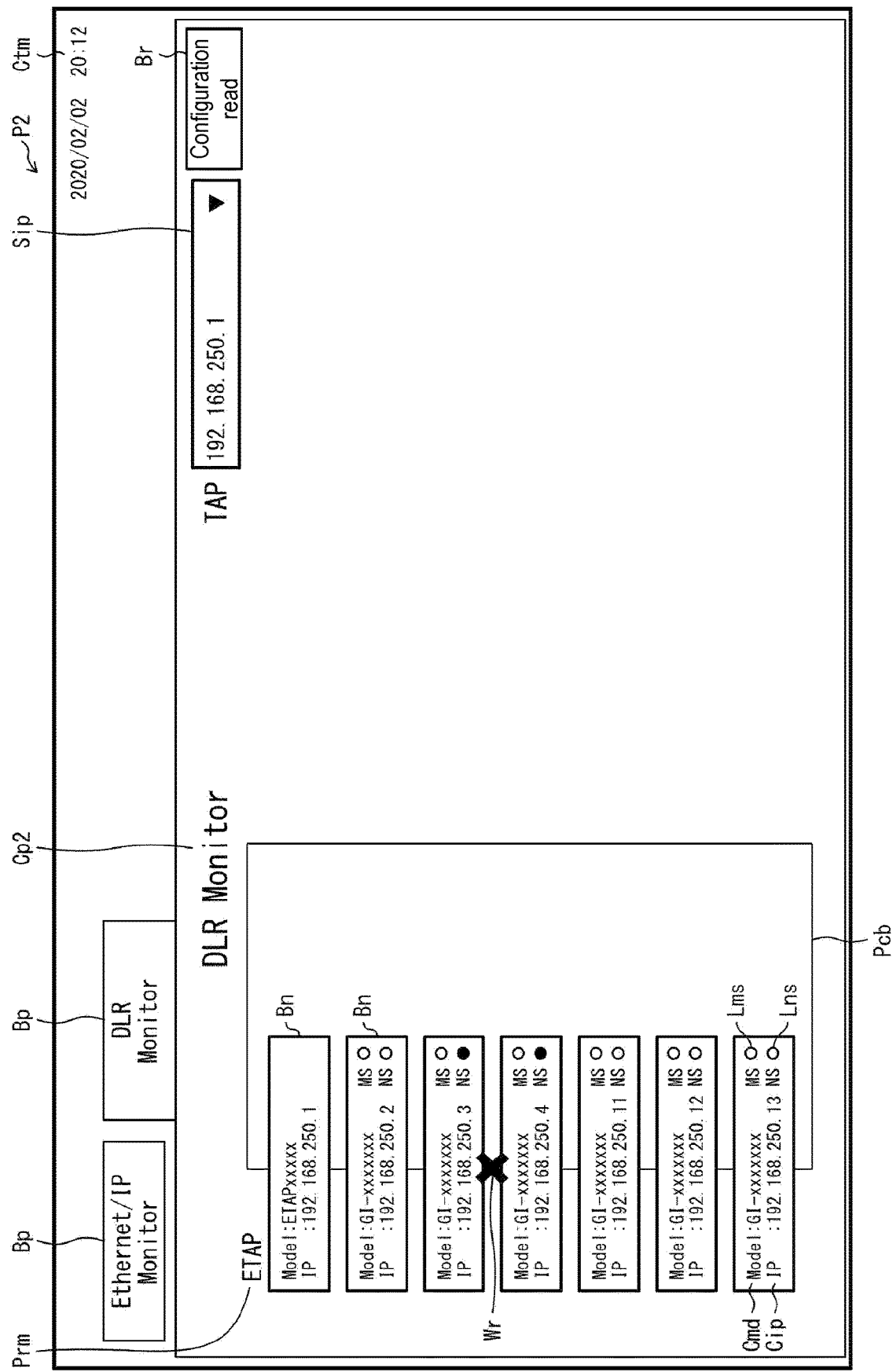
FIG. 7 is a view illustrating the ring configuration screen displayed on the terminal monitoring device according to Embodiment 2 of the invention.

FIG. 7 is a view illustrating the ring configuration screen P2 when an abnormality, such as communication interruption, occurs between specific terminals of the ring network 2. As shown in the figure, on the ring configuration screen P2, a warning image expression Wr is displayed on the connection line Pcb between the terminals where the abnormality occurs, and the abnormal place is specified and displayed in a easily understandable manner.

<Generation of Ring Configuration Screen>

The ring configuration screen P2 is generated according to the following. Like the case of Embodiment 1, the terminal information acquisition unit 14 acquires the apparatus information of each terminal present in the industrial network 1. In addition, the terminal information acquisition unit 14 inquires the target ring supervisor 60 about the configuration of the ring network 2 and receives the result of the inquiry. Based on such information, the ring configuration screen generation unit 152 disposes the selection boxes Bn of the terminals forming the ring network 2 in accordance with the configuration of the ring network 2.

The terminal information acquisition unit 14 periodically inquires the ring supervisor 60 about the status of the ring network 2 and receives the status. Based on such information, if an abnormality, such as communication interruption, occurs between specific terminals, the ring configuration screen generation unit 152 adds the warning image expression Wr for this purpose.

The ring network 2 has redundancy. Even if the communication interruption occurs at one place between the terminals, the communication of the terminals forming the ring network 2 is not interrupted. By making use of the redundancy, in the terminal monitoring device 10A, the communication abnormality between terminals in the ring network 2 can be displayed in a real-time manner on the ring configuration screen P2.

The list of the IP addresses of the ring supervisors 60 that can be displayed by the address list box Sip of the ring configuration screen P2 is extracted and generated based on the type information in the terminal information.

Embodiment 3

<Terminal Monitoring Device (10B)>

Figure 8:
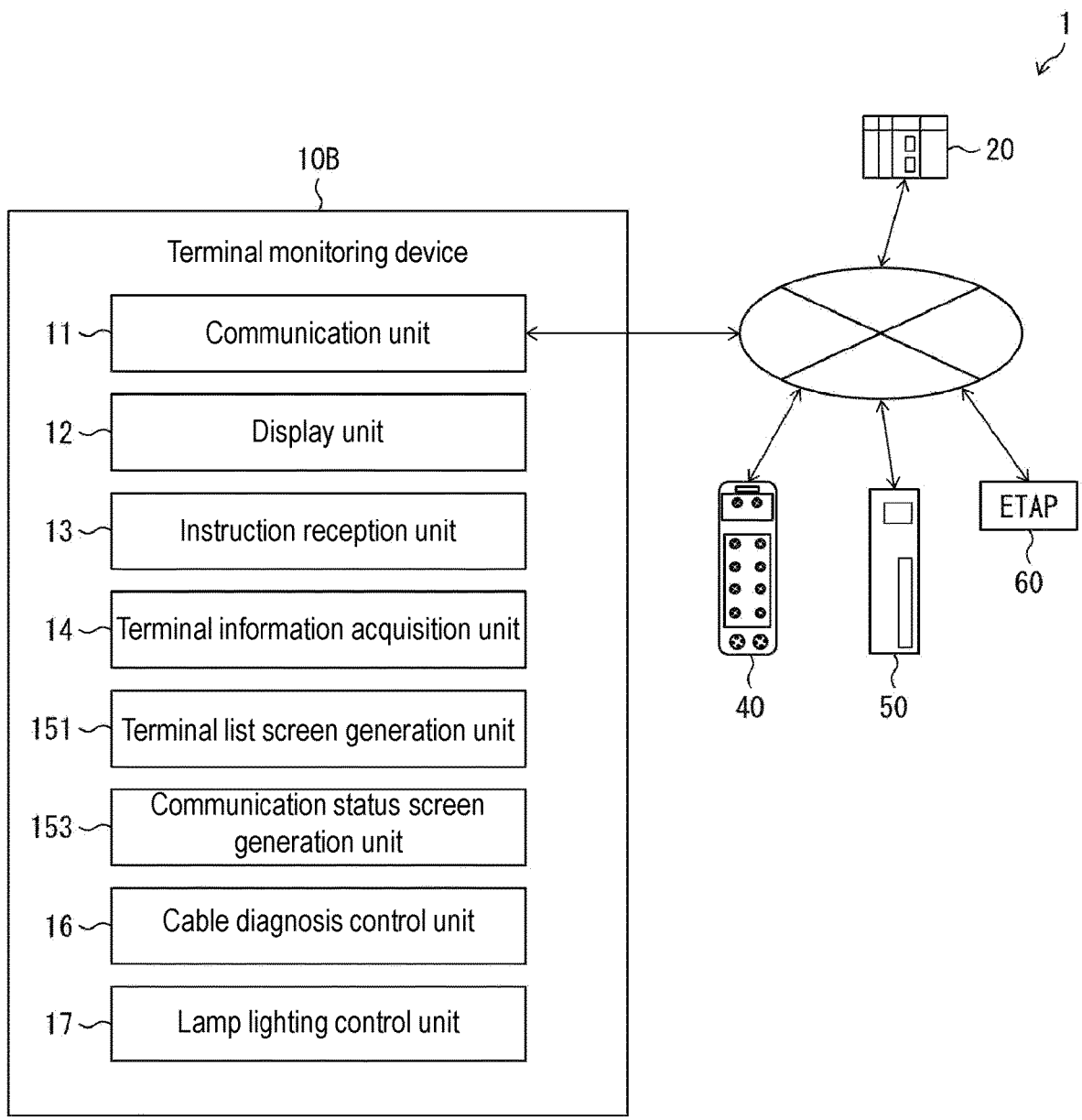
FIG. 8 is a block diagram illustrating a configuration of a terminal monitoring device according to Embodiment 3 of the invention.

In the terminal monitoring device 10B according to Embodiment 3, it is possible to display a communication status screen P3 in addition to the terminal list screen P1 which can be displayed by the terminal monitoring device 10 according to Embodiment 1. FIG. 8 is a block diagram illustrating a configuration of the terminal monitoring device 10B.

The terminal monitoring device 10B according to Embodiment 3 includes the communication unit 11, the display unit 12, the instruction reception unit 13, the terminal information acquisition unit 14, the terminal list screen generation unit 151, a communication status screen generation unit 153, a cable diagnosis control unit 16, and a lamp lighting control unit 17.

The terminal information acquired by the terminal information acquisition unit 14 of Embodiment 3 includes the contents of the terminal information according to Embodiment 1. Additionally, in the case where the terminal is the slave device 40, the terminal information acquired by the terminal information acquisition unit 14 may also include detailed information relating to communication executed by the slave device 49.

The cable diagnosis control unit 16 is a functional block that instructs the slave device 40 to execute a cable diagnosis, and acquires the result. The communication status generation unit 153 is a functional block generating and displaying the communication status screen P3 on the display unit 12 based on the result of execution of the cable diagnosis and the terminal information. The communication status screen P3 in Embodiment 3 is described in the following.

<Communication Status Screen>

FIG. 6 illustrates the communication status screen P3 generated by the communication status screen generation unit 153 and displayed on the display 121 of the display unit 12. The communication status screen P3 is a screen illustrating detailed information regarding the communication status of a specific slave device 40. On the communication status screen P3, the following is displayed.

A text expression Cp3 indicating that the screen is related to the specific slave device 40. Here, as an example, the model name and the characters indicating that the model is being monitored are described as "GI-xxxxxxx Monitor". Accordingly, the administrator, etc., can clearly recognize that the screen is a screen illustrating the information relating to the slave device 40 of a specific model.

A slave information selection box Bsi illustrating there are the communication status screen P3 and a screen relating to detailed information other than the communication status regarding the specific slave device 40. Here, as an example, "Ethernet/IP statistical information" is described for the communication status screen P3. By selecting a screen using the slave information selection box Bsi, it is easy for the administrator, etc., to select and display a desired screen on the display 121.

The time text expression Ctm. The port list box Spt. The configuration read box Br. The above are the same as the previous embodiment. The address list box Sip indicating the IP address of the selected slave device 40.

By operating the address list box Sip to select the IP address of a specific slave device 40 from the list of the IP addresses of the slave devices 40 that are displayed, the administrator, etc., can select the specific slave device 40 displayed on the communication status screen P3.

An image expression Pst illustrating a list of the statuses of the slave devices 40. As shown in FIG. 2, the image expression Pst imitates the expression of each lamp of the indicator 462 provided at the slave device 40, and displays synchronically with the indicator 462 of the slave device 40. The administrator, etc., can grasp the status of the slave device 40 by using the terminal monitoring device 10B without checking the actual slave device 40. A lamp lighting instruction box Bih. Details in this regard will be described in the following.

An image expression Pet imitating the Ethernet connector 41, the Ethernet connector 42, and the indicator 462 of the slave device 40. A cable information text expression Ccb displayed at the tip of a line extending from each of the expression of the Ethernet connector 41 and the expression of the Ethernet connector 42. The cable information text expression Ccb displays the status of the communication cable 70 connected to each Ethernet port.

By displaying the image expression Pet imitating the form of a portion of the slave device 40, the administrator, etc., can recognize that the content displayed on the communication status screen P3 is information relating to the slave device 40 of such model at a glance. In addition, by displaying the image expression Pet imitating each Ethernet connector of the slave device 40, the administrator, etc., can recognize that the content displayed on the communication status screen P3 is information specifically related to the Ethernet port of the slave device 40 at a glance.

Moreover, by associating the cable information text expression Ccb with each Ethernet port and displaying the cable information text expression Ccb, the displayed information being the information of which Ethernet port connected to the cable can be recognized at a glance.

Figure 9:
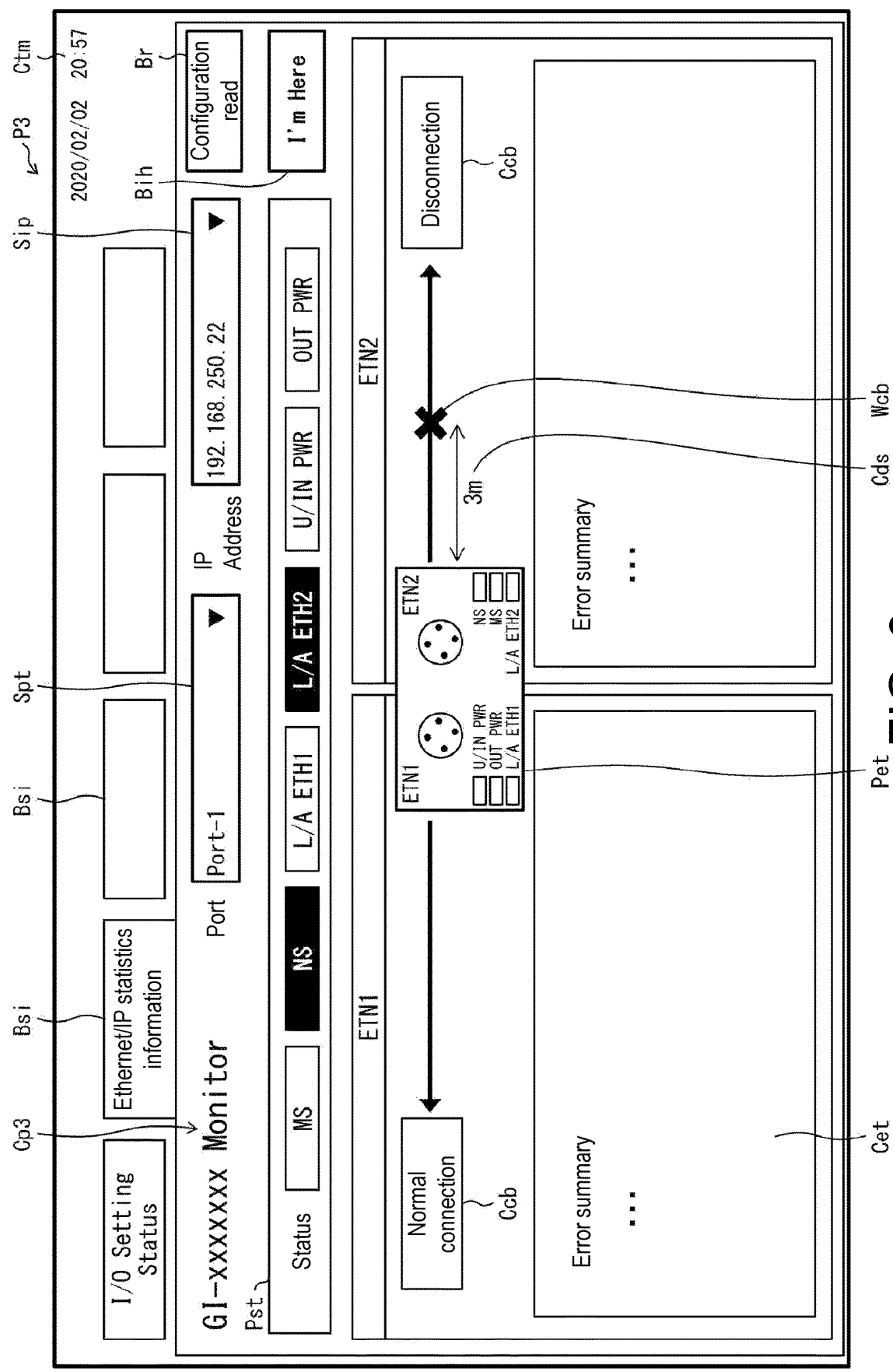
FIG. 9 is a view illustrating a communication status screen displayed on the terminal monitoring device according to Embodiment 3 of the invention.

As shown in FIG. 9, when a disconnection failure occurs in the communication cable 70 connected to the Ethernet port N2, for example, "disconnection" is displayed in the cable information expression Ccb. In addition, a warning image expression Wcb is displayed on the line imitating the communication cable 70 and extending from the Ethernet connector 42.

In addition, the distance from the Ethernet connector 42 to the place where the failure occurs is displayed as a distance text expression Cds. Accordingly, in the case where a failure of the communication cable 70 occurs, the administrator, etc., can recognize the fact that the failure occurs, the content of the failure, and the place where the failure occurs on the communication status screen P3 in a real-time manner. It is noted that, as the information of the failure of the communication cable 70, a failure of short circuit is also displayed in addition to a disconnection.

An Ethernet port text expression Cet, which is information regarding the communication status of each of the Ethernet port ETN1 and the Ethernet port ETN2. Here, the information regarding the communication status is the statistic information, etc., relating to communication errors, and is various information relating to the communication through each Ethernet port held by the slave device 40.

<Generation of Communication Status Screen>

The communication status screen P3 is generated according to the following. The instruction reception unit 13 receives an instruction of transitioning to the communication status screen P3 from the administrator, etc. Cases of such instruction are provided in the following:

A case where the selection box Bn representing the terminal as the slave device 40 is selected on the terminal list screen P1 or the ring configuration screen P2; a case where the selection box "Ethernet/IP statistic information" indicating the communication status screen P3 is selected from the slave information selection box Bsi on a screen other than the communication status screen P3, regarding the slave device 40; a case where the address list box Sip of the communication status screen P3 is operated to select the IP address of a specific slave device 40 from the list of IP addresses of the slave devices 40 that are displayed.

When the instruction reception unit 13 receives the instruction of transitioning to the communication status screen P3 regarding the specific slave device 40, the terminal information acquisition unit 14 inquires the slave device 40 about the terminal information relating to communication through the communication unit 11. The communication status screen generation unit 153 generates the communication status screen P3 based on such information, and displays the communication status screen P3 on the display unit 12.

Moreover, at this time, when the terminal information includes the information indicating that the communication of any Ethernet port is abnormal, the cable diagnosis control unit 16 makes the slave device 40 execute a cable diagnosis with respect to the communication cable 70 connected to the Ethernet port that is abnormal. By doing so, the cable diagnosis control unit 16 receives the result of the cable diagnosis from the slave device 40.

The result of the cable diagnosis may be any of normal, disconnected, short-circuited. In the case of being disconnected or short-circuited, the result of cable diagnosis may include a distance from the slave device 40 to the location of the failure. Based on the information, the communication status screen generation unit 153 generates the communication status screen P3 including the information of the failure of the communication cable and displays the communication status screen P3 on the display unit 12. Through simply displaying the communication status screen P3, the administrator, etc., can learn the occurrence of the failure of the communication cable 70 and the content thereof without specifically sending an instruction with respect to the slave device 40.

The inquiry about the terminal information for generating the communication status screen P3 is repetitively executed when the communication status screen P3 is displayed, and on the display status screen P3, detailed information regarding the communication status of the specific slave device 40 is displayed in a real-time manner.

The list of the IP addresses of the slave devices 40 that can be displayed by the address list box Sip of the communication status screen P3 is generated by extracting the type information in the terminal information.

<Lamp Lighting Instruction Box>

When the administrator, etc., operates the lamp lighting instruction box Bih ("I'm here" button) on the communication status screen P3, the communication status screen P3 turns on the lamp 461 of a specific slave device 40 that displays information. Then, through a further operation by the administrator, etc., afterwards, the lighting is turned off.

At this time, the lamp lighting control unit 17 instructs the slave device 40 to turn on or turn off the lamp 461 through the communication unit 11. The lighting described herein also includes blinking of the lamp 461.

Accordingly, the administrator, etc., can easily learn at which place of the field the slave device 40 displayed on the communication status screen P3 is present. Specifically, in the communication status screen P3, in the case where an abnormality such as a disconnection, etc., of the communication cable 70 or an abnormality of the slave device 40 itself is reported, by operating the lamp lighting instruction box Bih, the location where the abnormality occurs can be directly recognized.

Embodiment 4

<Terminal Monitoring Device (10C)>

Figure 10:
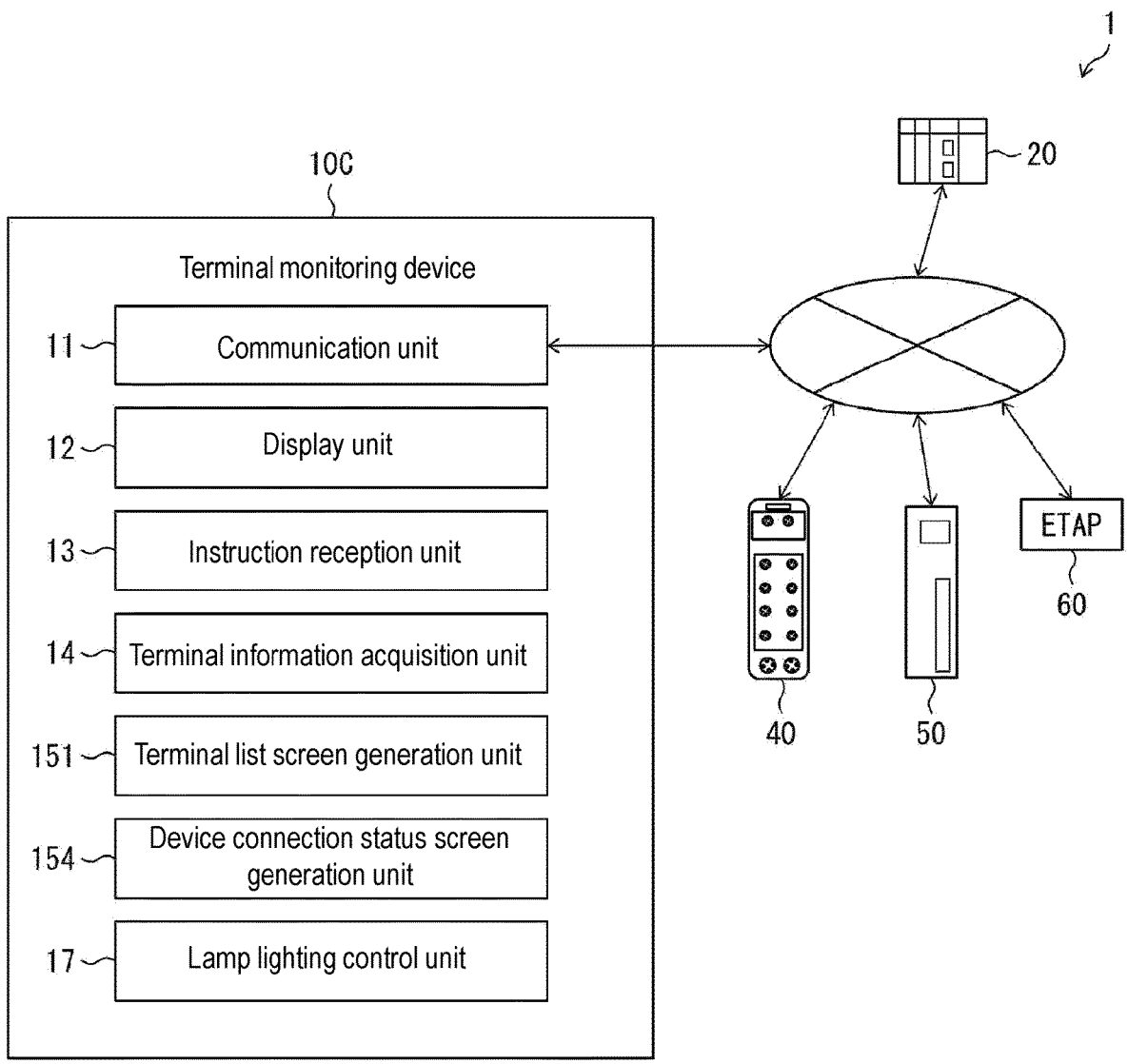
FIG. 10 is a block diagram illustrating a configuration of a terminal monitoring device according to Embodiment 4 of the invention.

In the terminal monitoring device 10C according to Embodiment 4, it is possible to display a device connection status screen P4 illustrating the connection status of the slave device 40 that is an I/O control apparatus with a device at each device port, in addition to the terminal list screen P1 which can be displayed by the terminal monitoring device 10 according to Embodiment 1. FIG. 10 is a block diagram illustrating a configuration of the terminal monitoring device 10C.

The terminal monitoring device 10C according to Embodiment 4 includes the communication unit 11, the display unit 12, the instruction reception unit 13, the terminal information acquisition unit 14, the terminal list screen generation unit 151, a device connection status screen generation unit 154, and the lamp lighting control unit 17.

The terminal information acquired by the terminal information acquisition unit 14 of Embodiment 4 includes the contents of the terminal information according to Embodiment 1. Additionally, in the case where the terminal is a slave device 40 that is an I/O control apparatus, the terminal information acquired by the terminal information acquisition unit 14 may include detailed information illustrating the connection status with a device at each device port.

The device connection status screen generation unit 154 is a functional block generating the device connection status screen P4 based on the terminal information and displaying the device connection status screen P4 on the display unit 12. The device connection status screen P4 in Embodiment 4 is described in the following.

<Device Connection Status Screen>

Figure 11:
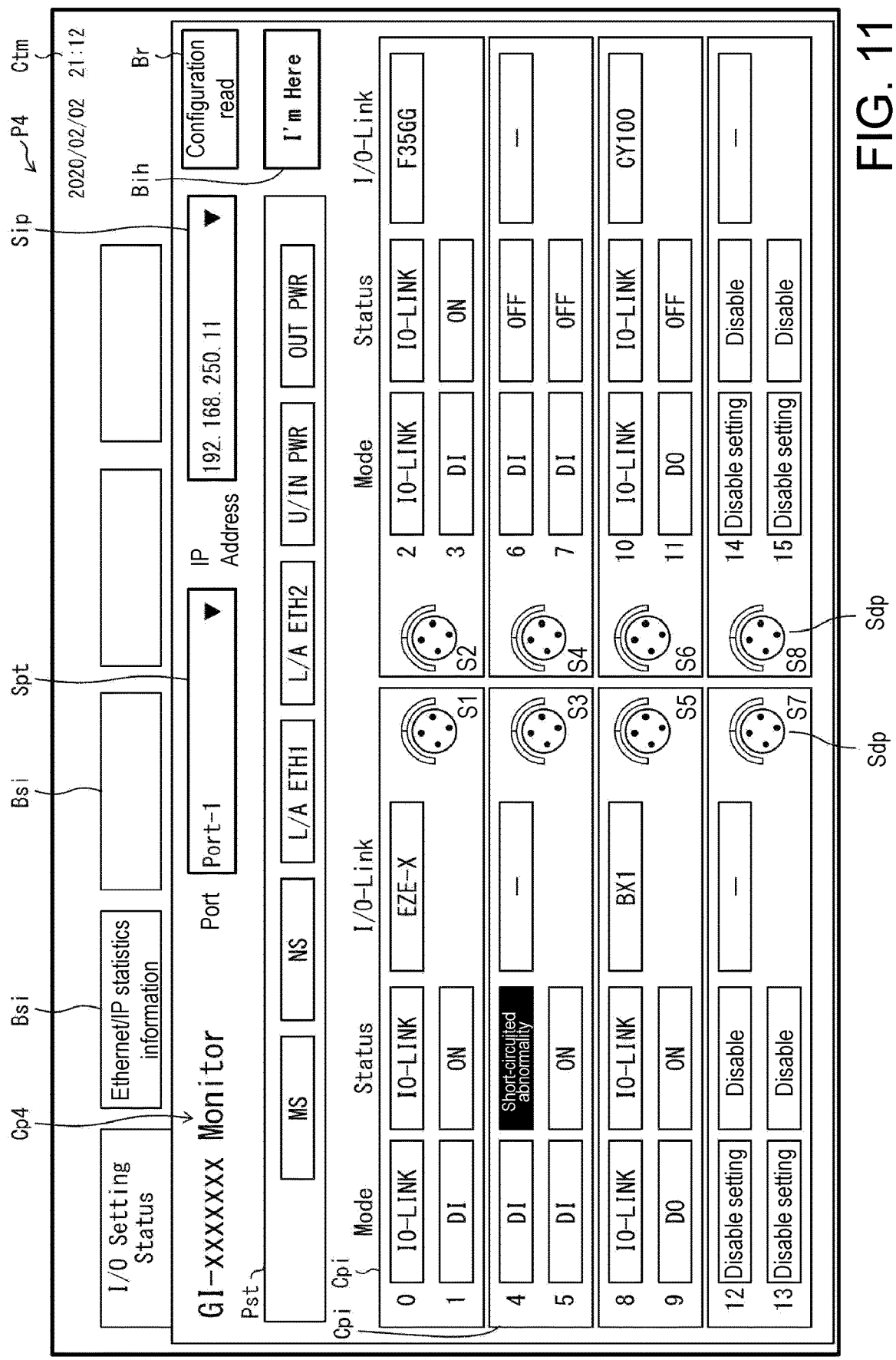
FIG. 11 is a view illustrating a device connection status screen displayed on the terminal monitoring device according to Embodiment 4 of the invention.

FIG. 11 illustrates the device connection status screen P4 generated by the device connection status screen generation unit 154 and displayed on the display 121 of the display unit 12. The device connection status screen P4 is a screen illustrating detailed information regarding the connection status of the slave device 40 as an I/O control apparatus with a device. On the device connection status screen P4, the following is displayed.

A text expression Cp4 indicating that the screen is related to the specific slave device 40. The text expression Cp4 is the same as the text expression Cp3 in the communication status screen P3. The slave information selection box Bsi showing there are the device connection status screen P4 and the screen other than the device connection status screen P4 regarding the specific slave device 40.

Here, as an example, "I/O Setting Status" is described for the communication status screen P3. In addition, "Ethernet/IP statistic information" is described for the communication status screen P3. A screen may further display information of other types without being limited to the example.

By selecting the screen using the slave information selection box Bsi, it is easy for the administrator, etc., to select and display a screen displaying desired information regarding the specific slave device 40 on the display 121. By making such slave information selection box Bsi common among various screens regarding the specific slave device 40, the administrator, etc., may make a selection easily.

The time text expression Ctm. The port list box Spt. The address list box Sip. The configuration read box Br. The image expression Pst illustrating a list of the statuses of the slave devices 40. The lamp lighting instruction box Bih. The above are the same as the previous embodiment.

An image expression Sdp imitating the form, including the arrangement, of the device connector 43 of the slave device 40. By displaying such image expression Sdp, the administrator, etc., can recognize that the content displayed by the device connection status screen P4 is the information relating to the slave device 40 of such model at a glance.

In addition, the administrator, etc., can recognize that the content displayed by the device connection status screen P4 is specifically related to the device port of the slave device 40 at a glance. With a device port information text expression Cpi being associated with each device connector 43 and displayed, which device port being related to the information illustrated in the device port information text expression Cpi can be recognized at a glance.

As shown in FIG. 11, the device port information text expression Cpi may include information as follows: an expression relating to setting of a connection mode with the device; an expression relating to the connection status with the device; and an expression relating to a model name of the connected device. The administrator, etc., can easily grasp the detailed information regarding devices set to and connected with the slave device 40 as an I/O control apparatus in this way through display of the display 121.

<Generation of Device Connection Status Screen>

The device connection status screen P4 is generated according to the following. The instruction reception unit 13 receives an instruction of transitioning to the device connection status screen P4 from the administrator, etc. Cases of such instruction are provided in the following:

A case where the selection box Bn representing the terminal as the slave device 40 is selected on the terminal list screen P1 or the ring configuration screen P2; a case where the selection box "I/O Setting Status" indicating the device connection status screen P4 is selected from the slave information selection box Bsi on a screen other than the device connection status screen P4, regarding the slave device 40; and a case where the address list box Sip of the device connection status screen P4 is operated to select the IP address of a specific slave device 40 from the list of IP addresses of the slave devices 40 that are displayed.

When the instruction reception unit 13 receives the instruction of transitioning to the device connection status screen P4 regarding a specific slave device 40, the terminal information acquisition unit 14 inquires the slave device 40 about the terminal information relating to the device connection status through the communication unit 11. The device connection status screen generation unit 154 generates the device connection status screen P4 based on such information, and displays the device connection status screen P4 on the display unit 12.

The inquiry about the terminal information for generating the device connection status screen P4 is repetitively executed when the device connection status screen P4 is displayed. Then, on the device connection status P4, the detailed information illustrating the connection status with the device at each device port of the specific slave device 40 is displayed in a real-time manner.

Implementation Example by Software

The functional blocks (specifically, the instruction reception unit 13, the terminal information acquisition unit 14, the terminal list screen generation unit 151, the ring configuration screen generation unit 152, the communication status screen generation unit 153, the device connection status screen generation unit 154, the cable diagnosis control unit 16, the lamp lighting control unit 17) of the terminal monitoring device 10, 10A, 10B, 10C may be realized by using logic circuits (hardware) formed in integrated circuits (IC chips), etc., and may also be realized by software.

In the case of the latter, the terminal monitoring device 10, 10A, 10B, 10C includes a computer executing the commands of a program, which is software, that realizes the respective functions. The computer, for example, includes one or more processor as well as a computer-readable recording medium storing the program. In addition, in the computer, the processor reads the program from the recording medium and executes the program, thereby achieving the objective of the invention.

As the processor, a central processing unit (CPU) can be used, for example. As the recording medium, a "non-transient tangible medium", such as a device, a disc, a card, a semiconductor memory, a programmable logic circuit, in addition to a read only memory (ROM), can be used.

In addition, the computer may further include a random access memory (RAM) which expands the program. In addition, the program may also be supplied to the computer via any transmission medium (such as a communication network or broadcast waves) able to transmit the program. An aspect of the invention can also be realized in the form of a data signal embedded in a carrier wave, in which the program is embodied by electronic transmission.

[Appendix]

A terminal monitoring device according to an aspect of the invention is connected to a network including slave devices, as terminals, controlled by a master device. The terminal monitoring device includes: a display unit, displaying a screen; a terminal information acquisition unit, acquiring terminal information including each address, type information, and communication status information from the terminals; and a terminal list screen generation unit, generating, based on the terminal information, a terminal list screen on which selection boxes representing the terminals and displaying the terminal information are disposed side by side, and displaying the terminal list screen on a display unit.

According to the configuration, the terminal monitoring device allowing the administrator, etc., to easily verify the statuses of the slave devices connected to the industrial network through the terminal list screen can be realized.

The terminal monitoring device according to the aspect may also include a configuration in which an arrangement order of the selection boxes on the terminal list screen follows an arrangement order of the addresses, and, in the arrangement order of the addresses, when a number is vacant, a position of the number that is vacant is displayed as a vacant field where the selection box is not disposed.

According to the configuration, the terminal monitoring apparatus allowing the administrator, etc., to easily grasp the statuses of the terminals in the industrial network even in the case where the connection of the terminal, such as the slave device, is changed, or the power of an apparatus not in use is turned off can be realized.

The terminal monitoring device according to the aspect may also include a configuration in which a configuration read box is disposed on the terminal list screen, and the configuration read box receives an instruction of acquiring the terminal information provided to the terminal information acquisition unit. According to the configuration, the terminal list screen can be updated at the timing when the administrator, etc., operates the configuration read box.

The terminal monitoring device according to the aspect may also include a configuration in which the network is provided with a partial network of a ring topology in which multiple slave devices are connected through a ring supervisor, the partial network being formed by the slave devices and the ring supervisor. In a case where the terminal is the ring supervisor, the terminal information includes: addresses of the slave devices forming the partial network and managed by the ring supervisor, and communication status information with the terminal in the partial network. The terminal monitoring device further includes a ring configuration screen generation unit generating, based on the terminal information, a ring configuration screen in which selection boxes representing the terminals forming the partial network and displaying the terminal information are arranged in a connection order of the terminals, and displaying the ring configuration screen on the display unit.

According to the configuration, the terminal monitoring device allowing the administrator, etc., to easily grasp the configuration of the partial network of the ring topology in the industrial network through the ring configuration screen can be realized.

The terminal monitoring device according to the aspect may also include a configuration in which, when the communication status information comprises information illustrating a communication abnormality between specific terminals in the partial network, an expression illustrating the communication abnormality is displayed between the selection boxes representing the specific terminals on the ring configuration screen.

According to the configuration, the terminal monitoring device allowing the administrator, etc., to, when a communication abnormality occurs between specific terminals, easily grasp the occurrence of the abnormality and the specification of the position of the abnormality can be realized.

The terminal monitoring device according to the aspect may also include a configuration in which, on the terminal list screen, when the selection box representing the terminal that is the ring supervisor is selected, the ring configuration screen is displayed.

According to the configuration, the terminal monitoring device allowing the administrator, etc., to easily select the desired partial network of the ring topology and display the details of the partial network can be realized.

The terminal monitoring device according to the aspect may also include a configuration in which the terminal information, in a case where the terminal is the slave device, includes information of a communication status relating to each of a plurality of communication ports of the slave device. The terminal monitoring device further includes: a communication status screen generation unit, generating, based on the terminal information, a communication status screen illustrating a communication status relating to each of the communication ports of the slave device, and displaying the communication status screen on the display unit; and a cable diagnosis control unit, making the slave device execute a diagnosis of a communication cable connected to a specific communication port and acquiring a result of the diagnosis. When information of the communication status regarding the slave device comprises information illustrating a communication abnormality of the specific communication port of the slave device, an expression illustrating a status of the communication cable based on the result of the diagnosis acquired from the cable diagnosis control unit is displayed on the communication status screen regarding the slave device.

According to the configuration, the terminal monitoring device allowing the administrator, etc., to easily grasp the status of the communication cable connected with the specific slave device in the industrial network through the communication status screen can be realized.

The terminal monitoring device according to the aspect may also include a configuration in which, when a selection box representing the terminal that is the slave device is selected on the terminal list screen or the ring configuration screen, the communication status screen regarding the slave device is displayed.

According to the configuration, the terminal monitoring device allowing the administrator, etc., to easily select a specific slave device from the industrial network and display the details of the communication status of the specific slave device can be realized.

The terminal monitoring device according to the aspect may also include a configuration in which, the terminal information, in a case where the terminal is the slave device in which a plurality of device ports for connection with devices are provided, includes information relating to communication with the device at each of the device ports of the slave device. The terminal monitoring device further includes a device connection status screen generation unit, generating, based on the terminal information, a device connection status screen illustrating connection statuses of the devices at the device ports of the slave device, and displaying the device connection status screen on the display unit.

According to the configuration, the terminal monitoring device allowing the administrator, etc., to easily grasp the statuses of the device ports in the slave device with multiple device ports in the industrial network through the device connection status screen can be easily realized.

The terminal monitoring device according to the aspect may also include a configuration in which, when a selection box representing the terminal that is the slave device is selected on the terminal list screen or the ring configuration screen, the device connection status screen regarding the slave device is displayed.

According to the configuration, the terminal monitoring device allowing the administrator, etc., to easily select the specific slave device with multiple device ports from the industrial network and display the details of the statuses of the device ports can be realized.

The terminal monitoring device according to the aspect may also include a configuration which further includes a lamp lighting control unit which makes the slave device turn on a lamp mounted on the slave device. A lighting instruction box is disposed on the communication status screen or the device connection status screen, and the lighting instruction box receives a lamp lighting instruction provided for the slave device displayed on the screen to the lamp lighting control unit.

According to the configuration, the terminal monitoring device allowing the administrator, etc., to easily find the specific slave device of the industrial network illustrated in the communication status screen or the device connection status screen can be realized.

The invention is not limited to the above-mentioned application examples, configuration examples, and embodiments, and various modifications can be made within the scope of the claims. The technical scope of the invention also includes embodiments obtained by appropriately combining the technical means as disclosed.

What is claimed is:

1. A terminal monitoring device, connected to a network comprising slave devices, as terminals, controlled by a master device, the terminal monitoring device comprising:
   a display unit, displaying a screen;
   a terminal information acquisition unit, acquiring terminal information comprising each address, type information, and communication status information from the terminals, wherein the terminal information, in a case where the terminal is the slave device, comprises information of a communication status relating to each of a plurality of communication ports of the slave device;
   a terminal list screen generation unit, generating, based on the terminal information, a terminal list screen on which selection boxes representing the terminals and displaying the terminal information are disposed side by side, and displaying the terminal list screen on a display unit;

a communication status screen generation unit, generating, based on the terminal information, a communication status screen illustrating a communication status relating to each of the communication ports of the slave device, and displaying the communication status screen on the display unit;

a cable diagnosis control unit, making the slave device execute a diagnosis of a communication cable connected to a specific communication port and acquiring a result of the diagnosis, and a lamp lighting control unit which makes the slave device turn on a lamp mounted on the slave device, wherein when information of the communication status regarding the slave device comprises information illustrating a communication abnormality of the specific communication port of the slave device, an expression illustrating a status of the communication cable based on the result of the diagnosis acquired from the cable diagnosis control unit is displayed on the communication status screen regarding the slave device, and a lighting instruction box is disposed on the communication status screen, the lighting instruction box receives a lamp lighting instruction provided for the slave device displayed on the communication status screen to the lamp lighting control unit.

2. The terminal monitoring device as claimed in claim 1, wherein an arrangement order of the selection boxes on the terminal list screen follows an arrangement order of the addresses, and in the arrangement order of the addresses, when a number is vacant, a position of the number that is vacant is displayed as a vacant field where the selection box is not disposed.

3. The terminal monitoring device as claimed in claim 2, wherein an information acquisition instruction box is disposed on the terminal list screen, and the information acquisition instruction box receives an instruction of acquiring the terminal information provided to the terminal information acquisition unit.

4. The terminal monitoring device as claimed in claim 2, wherein the network is provided with a partial network of a ring topology in which a plurality of slave devices are connected through a ring supervisor, the partial network being formed by the slave devices and the ring supervisor, in a case where the terminal is the ring supervisor, the terminal information comprises: addresses of the slave devices forming the partial network and managed by the ring supervisor, and communication status information with the terminal in the partial network, and the terminal monitoring device further comprises a ring configuration screen generation unit generating, based on the terminal information, a ring configuration screen in which selection boxes representing the terminals forming the partial network and displaying the terminal information are arranged in a connection order of the terminals, and displaying the ring configuration screen on the display unit.

5. The terminal monitoring device as claimed in claim 2, wherein the terminal information, in a case where the terminal is the slave device in which a plurality of device ports for connection with devices are provided, comprises information relating to communication with the device at each of the device ports of the slave device, and the terminal monitoring device further comprises a device connection status screen generation unit, generating, based on the terminal information, a device connection status screen illustrating connection statuses of the devices at the device ports of the slave device, and displaying the device connection status screen on the display unit.

6. The terminal monitoring device as claimed in claim 1, wherein an information acquisition instruction box is disposed on the terminal list screen, and the information acquisition instruction box receives an instruction of acquiring the terminal information provided to the terminal information acquisition unit.

7. The terminal monitoring device as claimed in claim 1, wherein the network is provided with a partial network of a ring topology in which a plurality of slave devices are connected through a ring supervisor, the partial network being formed by the slave devices and the ring supervisor, in a case where the terminal is the ring supervisor, the terminal information comprises: addresses of the slave devices forming the partial network and managed by the ring supervisor, and communication status information with the terminal in the partial network, and the terminal monitoring device further comprises a ring configuration screen generation unit generating, based on the terminal information, a ring configuration screen in which selection boxes representing the terminals forming the partial network and displaying the terminal information are arranged in a connection order of the terminals, and displaying the ring configuration screen on the display unit.

8. The terminal monitoring device as claimed in claim 7, wherein when the communication status information comprises information illustrating a communication abnormality between specific terminals in the partial network, an expression illustrating the communication abnormality is displayed between the selection boxes representing the specific terminals on the ring configuration screen.

9. The terminal monitoring device as claimed in claim 8, wherein, on the terminal list screen, when the selection box representing the terminal that is the ring supervisor is selected, the ring configuration screen is displayed.

10. The terminal monitoring device as claimed in claim 8, wherein when a selection box representing the terminal that is the slave device is selected on the ring configuration screen, the communication status screen regarding the slave device is displayed.

11. The terminal monitoring device as claimed in claim 7, wherein, on the terminal list screen, when the selection box representing the terminal that is the ring supervisor is selected, the ring configuration screen is displayed.

12. The terminal monitoring device as claimed in claim 11, wherein when a selection box representing the terminal that is the slave device is selected on the ring configuration screen, the communication status screen regarding the slave device is displayed.

13. The terminal monitoring device as claimed in claim 7, wherein when a selection box representing the terminal that is the slave device is selected on the ring configuration screen, the communication status screen regarding the slave device is displayed.

14. The terminal monitoring device as claimed in claim 1, wherein when a selection box representing the terminal that is the slave device is selected on the terminal list screen, the communication status screen regarding the slave device is displayed.

15. A terminal monitoring device, connected to a network comprising slave devices, as terminals, controlled by a master device, the terminal monitoring device comprising:
- a display unit, displaying a screen;
- a terminal information acquisition unit, acquiring terminal information comprising each address, type information, and communication status information from the terminals, wherein the terminal information, in a case where the terminal is the slave device in which a plurality of device ports for connection with devices are provided, comprises information relating to communication with the device at each of the device ports of the slave device;
- a terminal list screen generation unit, generating, based on the terminal information, a terminal list screen on which selection boxes representing the terminals and displaying the terminal information are disposed side by side, and displaying the terminal list screen on a display unit;
- a device connection status screen generation unit, generating, based on the terminal information, a device connection status screen illustrating connection statuses of the devices at the device ports of the slave device, and displaying the device connection status screen on the display unit; and
- a lamp lighting control unit which makes the slave device turn on a lamp mounted on the slave device,
- wherein a lighting instruction box is disposed on the device connection status screen, the lighting instruction box receives a lamp lighting instruction provided for the slave device displayed on the device connection status screen to the lamp lighting control unit.

16. The terminal monitoring device as claimed in claim 15, wherein when a selection box representing the terminal that is the slave device is selected on the terminal list screen, the device connection status screen regarding the slave device is displayed.

* * * * *